US011364831B2

(12) United States Patent
Ceglarek

(10) Patent No.: US 11,364,831 B2
(45) Date of Patent: Jun. 21, 2022

(54) MOTOR VEHICLE SEAT

(71) Applicant: Faurecia Autositze GmbH, Stadthagen (DE)

(72) Inventor: Piotr Ceglarek, Katowice (PL)

(73) Assignee: Faurecia Autositze GmbH, Stadthagen (DE)

( * ) Notice: Subject to any disclaimer, the term of this patent is extended or adjusted under 35 U.S.C. 154(b) by 0 days.

(21) Appl. No.: 16/662,365

(22) Filed: Oct. 24, 2019

(65) Prior Publication Data

US 2020/0139868 A1     May 7, 2020

(30) Foreign Application Priority Data

Nov. 5, 2018    (DE) .......................... 102018127495.5

(51) Int. Cl.
*B60N 2/90*     (2018.01)
*A61H 9/00*    (2006.01)
*B60N 2/02*    (2006.01)

(52) U.S. Cl.
CPC ........... *B60N 2/914* (2018.02); *A61H 9/0078* (2013.01); *B60N 2/0244* (2013.01); *B60N 2/976* (2018.02); *A61H 2201/0134* (2013.01); *A61H 2201/0149* (2013.01); *A61H 2201/1623* (2013.01); *A61H 2205/081* (2013.01); *B60N 2002/026* (2013.01)

(58) Field of Classification Search
CPC ................................ B60N 2/914; B60N 2/976
See application file for complete search history.

(56) References Cited

U.S. PATENT DOCUMENTS 3,330,598 A * 7/1967 Whiteside ................ A47C 4/54
                                                    297/284.3
3,870,450 A * 3/1975 Graebe .............. A61G 7/05769
                                                    425/269
5,556,169 A * 9/1996 Parrish .................. A42B 3/121
                                                    297/452.28
5,826,937 A * 10/1998 Massara .................. B60N 2/80
                                                    297/284.6
(Continued)

FOREIGN PATENT DOCUMENTS

DE      102011010209 A1    8/2012
DE      102012024854 A1    6/2013
(Continued)

*Primary Examiner* — David R Dunn
*Assistant Examiner* — Tania Abraham
(74) *Attorney, Agent, or Firm* — Laurence P. Colton; Smith Tempel Blaha LLC

(57) ABSTRACT

A motor vehicle seat having a seat region, in particular a backrest or a seat part, wherein at least one fluid-filled hollow body connected to a first fluid inlet and outlet conduit is arranged in the seat region, wherein the at least one hollow body is part of a seat displacement device and/or a massage device and wherein the hollow body is supported by a support device also arranged in the seat region on its side facing away from an occupant sitting in the motor vehicle seat, characterized in that the support device in turn comprises at least one fluid-filled hollow support body which is arranged in the seat region and is spatially separated from the at least one hollow body, wherein the firmness of the seat and/or the strength of the massage application can additionally be adjusted by varying the filling of the hollow support body.

3 Claims, 4 Drawing Sheets

(56) References Cited

U.S. PATENT DOCUMENTS

| | | | | |
|---|---|---|---|---|
| 6,203,105 B1* | 3/2001 | Rhodes, Jr. | .............. | A47C 4/54 |
| | | | | 297/284.6 |
| 6,916,300 B2 | 7/2005 | Hester | | |
| 7,621,596 B2* | 11/2009 | Petzel | .................... | A47C 7/467 |
| | | | | 297/284.6 |
| 7,748,781 B2* | 7/2010 | Bass | .................... | B60N 2/2851 |
| | | | | 297/250.1 |
| 7,996,940 B1* | 8/2011 | Dahm | ................. | A47C 27/082 |
| | | | | 297/452.41 |
| 9,302,601 B2* | 4/2016 | Worlitz | .................. | B60N 2/976 |
| 9,321,373 B2* | 4/2016 | Sakata | .................. | B60N 2/914 |
| 9,896,003 B2* | 2/2018 | Tamura | .................. | B60N 2/914 |
| 2003/0030319 A1* | 2/2003 | Clapper | .................. | A47C 4/54 |
| | | | | 297/452.41 |
| 2009/0230742 A1* | 9/2009 | Habegger | .............. | B60N 2/914 |
| | | | | 297/452.41 |
| 2013/0285426 A1* | 10/2013 | Arant | .................. | B60N 2/7082 |
| | | | | 297/452.48 |
| 2014/0265491 A1* | 9/2014 | Galbreath | .............. | B60N 2/914 |
| | | | | 297/284.1 |
| 2017/0080838 A1* | 3/2017 | Dry | ........................ | B60N 2/565 |
| 2018/0079335 A1* | 3/2018 | Jaranson | .................. | B60N 2/06 |
| 2018/0086238 A1* | 3/2018 | Onuma | .................. | B60N 2/976 |
| 2018/0088573 A1* | 3/2018 | Watanabe | ............. | B60W 50/16 |
| 2018/0370405 A1* | 12/2018 | Klein | ....................... | A61H 9/00 |

FOREIGN PATENT DOCUMENTS

| | | |
|---|---|---|
| DE | 102013224197 A1 | 6/2014 |
| DE | 102013220563 A1 | 4/2015 |
| DE | 202017103162 | 7/2018 |
| EP | 1904338 B1 | 4/2008 |

\* cited by examiner

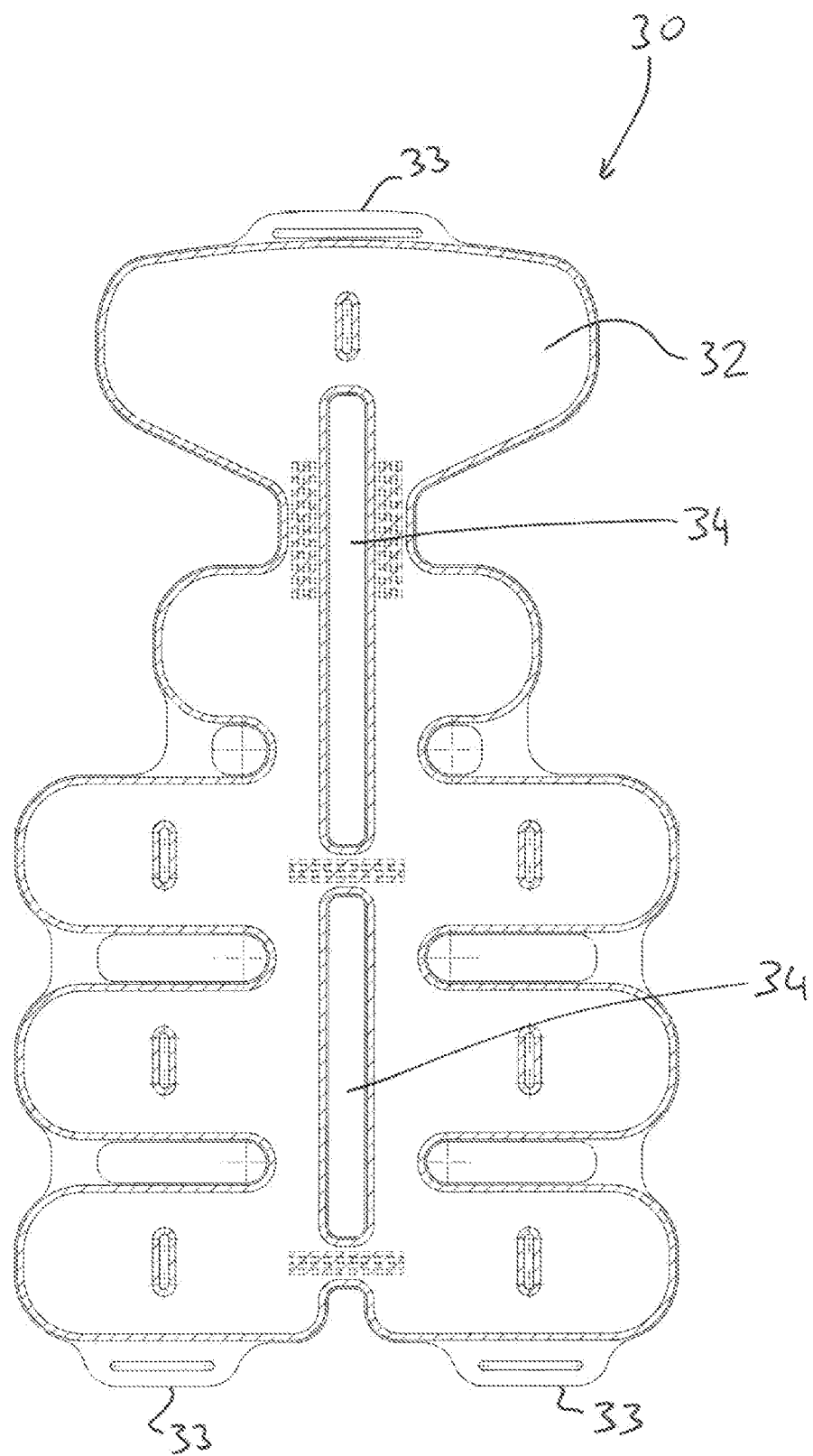

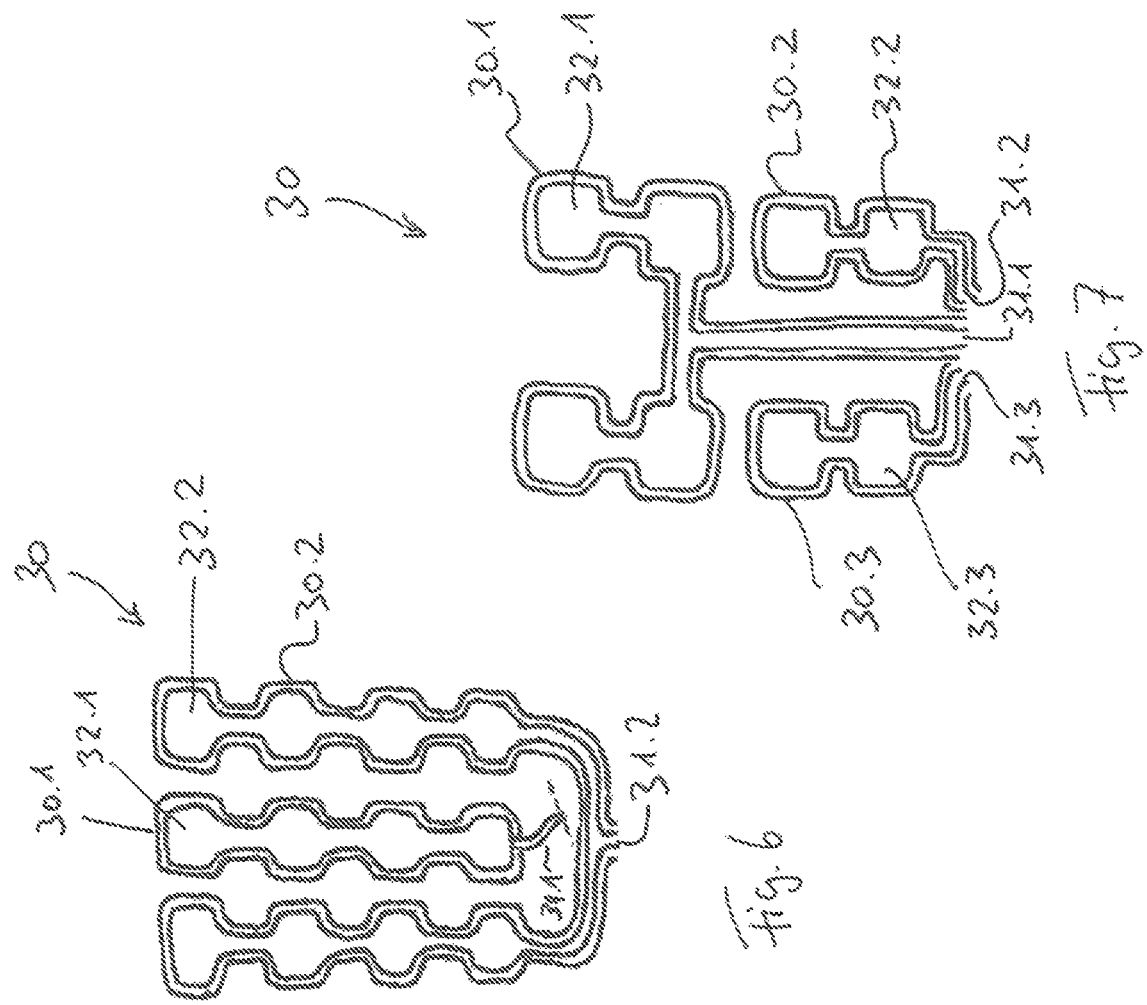
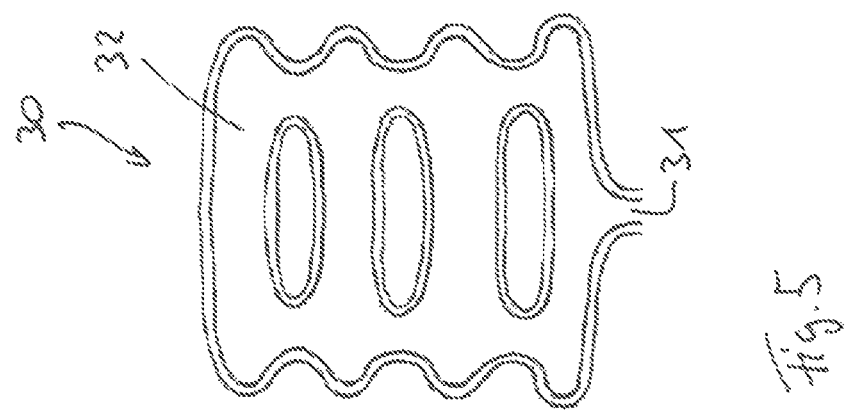

MOTOR VEHICLE SEAT

CROSS REFERENCE TO RELATED APPLICATIONS

The application claims priority on and the benefit German Patent Application No. 10 2018 127 495.5 having a filing date of 5 Nov. 2018.

BACKGROUND OF THE INVENTION

Technical Field

The invention relates to a motor vehicle seat having a seat region, in particular a backrest or a seat part, wherein at least one fluid-filled hollow body connected to a first fluid inlet and outlet conduit is arranged in the seat region, wherein the at least one hollow body is part of a seat displacement device and/or a massage device and wherein the hollow body is supported by a support device also arranged in the seat region on its side facing away from an occupant sitting in the motor vehicle seat.

Prior Art

Motor vehicle seats in which the adjustment or fine adjustment of the seat is effected by means of hollow bodies which can be filled with fluids are already known. For example, DE 10 2013 224 197 A1 discloses a seat surface extension in which three airbags are arranged under the cushion, two of which are connected to each other. These airbags are supported and fill the space immediately in front of the seat, thereby lifting the cushion. The cushion cover is tensioned by a winding device mounted under the seat so that the seat surface remains smooth and the cushion is retracted when air is released from the airbags. The airbags only serve to shape the seat part, the tightness is given by the cushion and the tension force of the tensioning winder.

DE 10 2011 010 209 A1 discloses a mat having multiple adjustment and massage bladders that can be filled and emptied in different ways. In order to prevent the adjustments from acting too selectively, pressure distribution members are arranged between the bladders and the fabric covering to make the changes appear flatter.

DE 10 2013 220 563 A1 discloses a system for pneumatically filling a bladder system in which the bladders can be operated separately.

Motor vehicle seats equipped like this, which offer integrated massage functions, are becoming more and more popular. These are known to be in the form of fluid-filled bladders which are inserted into corresponding recesses in the seat upholstery, as known from DE 10 2012 024 854 A1, EP 1 904 338 B1 or U.S. Pat. No. 6,916,300 B2, for example. Accordingly, the bladders are embedded in the seat cushion under the seat cover. A massage function can be realized by inflating/deflating and periodically repeating this process. Usually different massage programs are implemented, which can be selected by the user. Corresponding to the selected massage program a certain stimulation of single or multiple bladders occurs. These bladders must be supported at the rear so that the appropriate pressure can be built up on the back of the vehicle occupant. This is usually done by means of a support plate integrated either in the cushion or behind it, which can absorb forces.

Corresponding support plates are usually relatively rigid formations, as they are intended to ensure that the massage force in the bladder is transferred to the person to be massaged. When the massage is switched off, however, the support plate remains so that the vehicle seat remains relatively stiff overall. In addition, the preferences regarding the massage pressure on the body vary from person to person.

BRIEF SUMMARY OF THE INVENTION

The object of the present invention is therefore to specify a motor vehicle seat of the kind mentioned at the beginning, which firstly offers a high level of seating comfort and secondly allows individual adjustments even when the massage function is switched on. This object is solved by a motor vehicle seat having a seat region, in particular a backrest or a seat part, wherein at least one fluid-filled hollow body connected to a first fluid inlet and outlet conduit is arranged in the seat region, wherein the at least one hollow body is part of a seat displacement device and/or a massage device and wherein the hollow body is supported by a support device also arranged in the seat region on its side facing away from an occupant sitting in the motor vehicle seat, characterized in that the support device in turn comprises at least one fluid-filled hollow support body which is arranged in the seat region and is spatially separated from the at least one hollow body, wherein the firmness of the seat and/or the strength of the massage application can additionally be adjusted by varying the filling of the hollow support body. Advantageous embodiments can be found in the dependent claims.

The subject matter according to the invention is a motor vehicle seat having a seat region, in particular a backrest or a seat part, wherein at least one fluid-filled hollow body connected to a first fluid inlet and outlet conduit is arranged in the seat region. According to the invention, the at least one hollow body is part of a seat displacement device and/or a massage device. This makes it possible for the occupant of the vehicle seat to additionally adjust the firmness of the seat and/or the strength of the massage application by varying the filling of the hollow support body, thereby improving the seating comfort. The seat region preferably comprises upholstery and a seat cover. The hollow body is supported on its side, facing away from an occupant seated in the vehicle seat, by a support device also arranged in the seat region. The support device in turn comprises at least one fluid-filled hollow support body arranged in the seat region and spatially separated from the at least one hollow body. Spatially separated in the sense of the present invention means that the hollow support body and at least one hollow body are at least not directly connected to each other via an opening in a common wall. It is conceivable, however, according to a specific embodiment that both the hollow support body and the at least one other hollow body are fed via a common conduit and/or a common fluid source.

Preferably the hollow support body has no fluid connection to the at least one hollow body. According to a further preferred embodiment, the hollow support body can be connected to a second fluid inlet and outlet conduit different from the first fluid inlet and outlet conduit. Liquids or gases can be used as fluids. Air is the preferred choice in the present case.

The firmness of the support body can be adjusted by replacing the prior art solid support plate with a fluid-filled hollow body. This allows the effect of the hollow body filling to be adjusted according to the needs of the occupant.

According to a particularly preferred embodiment, the at least one fluid-filled hollow body is arranged in a recess in the upholstery. If the fluid-filled hollow body is not used (e.g. when the massage function is switched off), the "normal" support function of the seat region is mainly performed by the upholstery.

In a further preferred embodiment, the motor vehicle seat has multiple hollow bodies, which are interconnected by non-fluid-conducting connecting means. If a plurality of hollow bodies are used, they have to be arranged in rigid positions relative to the seat part and one below the other. Particularly when assembling the seat part, in which the hollow support bodies and the hollow bodies are first arranged before the upholstery is applied, it is advantageous to achieve precise positioning of the hollow bodies on the bearing structure of the seat region. It has proved to be particularly advantageous that the multiple hollow bodies are connected to each other in a mat-like manner by means of the connecting means. The use of the massage device thus does not result in any lateral displacement of the hollow bodies among each other which would be detrimental to the massage effect.

According to a further preferred embodiment, in the case of more than one hollow body, these can be filled separately with the fluid inlet and outlet conduit. This allows different regions of the seat region to be controlled separately. Certain regions of the seat region can be adapted to the occupant. Depending on the refinement, it can even react to the body height of the occupant. With a massage function, certain parts of the body can thus be massaged.

It has proved to be advantageous that a plurality of hollow bodies can be grouped together and filled together. In this way, lordosis or supports in the region of the lower thighs can be adjusted together or larger back parts massaged.

In a particularly preferred embodiment, the hollow support body is designed in such a manner that it can support all the hollow bodies of the seat region. In this embodiment, the firmness of the seat region or the strength of the massage members is evenly adjusted.

Alternatively, the subject matter of the invention can be configured in such a manner that at least two hollow support bodies are arranged in a seat region, wherein they can independently support at least one corresponding hollow support body in subregions of the seat region. Such an arrangement makes it possible to adjust the seat region more individually and thereby adjust specific regions separately and provide them with different support hardness.

BRIEF DESCRIPTION OF THE DRAWINGS

The invention will be explained in the following by means of the drawings and several embodiment examples.

FIG. 3 shows the front view of a further embodiment of a support device according to the invention.

FIG. 5 shows an embodiment in which a hollow support body is arranged in the seat region.

FIG. 6 shows an embodiment in which two hollow support bodies are arranged in the seat region.

FIG. 7 shows an embodiment in which three hollow support bodies are arranged in the seat region.

DETAILED DESCRIPTION OF PREFERRED EMBODIMENTS

Figure 1:
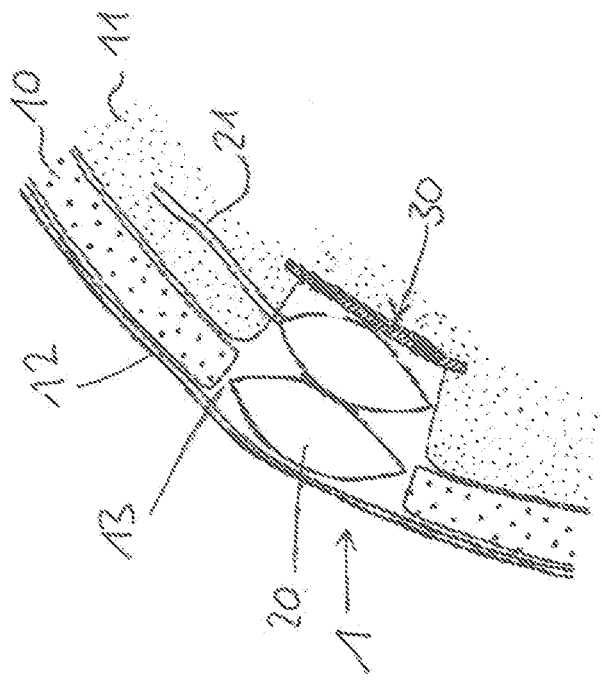
FIG. 1 shows a partial sectional view of the prior art.

FIG. 1 shows a partial section through a seat region 1. The upholstery 10, 11 has a recess 13 which is covered by the seat cover 13. Opposite the seat cover 13, a rigid or at least largely rigid support device 30 is arranged in the recess 13, which is anchored laterally in the cushion 11. A hollow body 20 in the form of communicating bladders is arranged between the support device 30 and the seat cover 12. This hollow body 20 is supplied via a fluid inlet and outlet conduit 21 with a fluid, i.e. the hollow body 20 is filled or emptied, which causes it to press through the seat cover 12 against the part of the occupant's body resting on this point during filling. The hollow body 20 can belong to an adjustment device such as a lordosis or a massage device. The rigid support device 30 can, in such an arrangement, cause the mobility of the upholstery 11 to be impaired and thus impair the original seating comfort.

Figure 2:
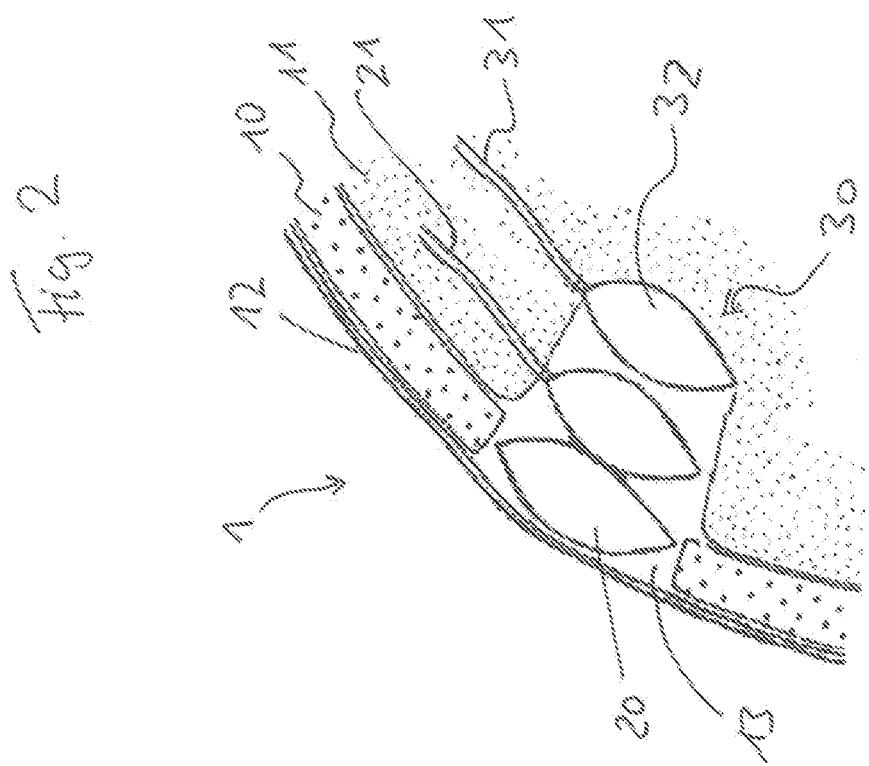
FIG. 2 shows a partial sectional view of a corresponding embodiment according to invention.

FIG. 2 shows a similar partial section to that in FIG. 1, but of a motor vehicle seat according to the invention. The seat region 1 differs substantially from the prior art in that the support device 30 is not a rigid component, but a likewise inflatable hollow support body 32. In the example shown, this hollow support body 32 is preferably supplied via a separate fluid inlet and outlet conduit 31. The hollow support body 32 and the at least one hollow body 20 can also be fed from a common fluid source or a common conduit, which branches conveniently to the hollow body 20 on one side and to the hollow support body 32 on the other side. If the hollow body 20 is not used, it is then emptied as far as possible, and the hollow support body 32 is also emptied. Since the emptied hollow support body 32 is flexible, it does not impair the mobility of the upholstery 11 and does not have a negative effect on seating comfort. When the hollow body 20 is operated, the hollow support body 32 is also filled with fluid. As a result, it forms an abutment, which expands upwards towards the seat cover when the hollow body 20 is filled and presses against a body part of an occupant. This pressure can be permanent if the hollow body 20, for example, represents an adjustment function of the seat region 1, or it can be periodic if the hollow body 20, for example, is to perform a massage function. For this purpose, the hollow support body 32 can be filled with fluid to different extents, so that the strength of the support effect of the hollow body 20 can be influenced.

If the hollow support body 32 is extensively filled, it becomes relatively hard, so that the occupant accordingly perceives a hard seat. If the hollow support body 32 is filled to a lesser extent, the occupant perceives this as correspondingly softer, because part of the force exerted on the environment by the hollow body 20 during filling with fluid, in particular air, is used to deform the hollow support body 32.

With the motor vehicle seat according to the invention, it is possible to design adjustment functions and/or massage functions that are more individually adjustable compared to the prior art and thus increase the comfort of a motor vehicle seat.

FIG. 3 shows an embodiment example of a support device 30 according to the invention for a seat region 1, in particular for a backrest. The support device 30 comprises a hollow support body 32, which is formed according to the specifications. In the drawing, retainers 33 are attached to the top and bottom of the hollow support body 32, preferably one at the top, two at the bottom, on which retainers, for example, hollow bodies 20 or hollow bodies 20 connected using connecting means 22 can be arranged (shown in FIG. 4). The retainers 33 are configured as slots in this case, but all possible other retainers 33 are also conceivable, such as snap fasteners, plug-in flaps, hooks and others. In this embodiment example, two central fastening openings 34 are arranged in the vertical central line in the drawing, with which the composite of support device 30 and hollow body 20 can be arranged on the seat frame.

Figure 4:
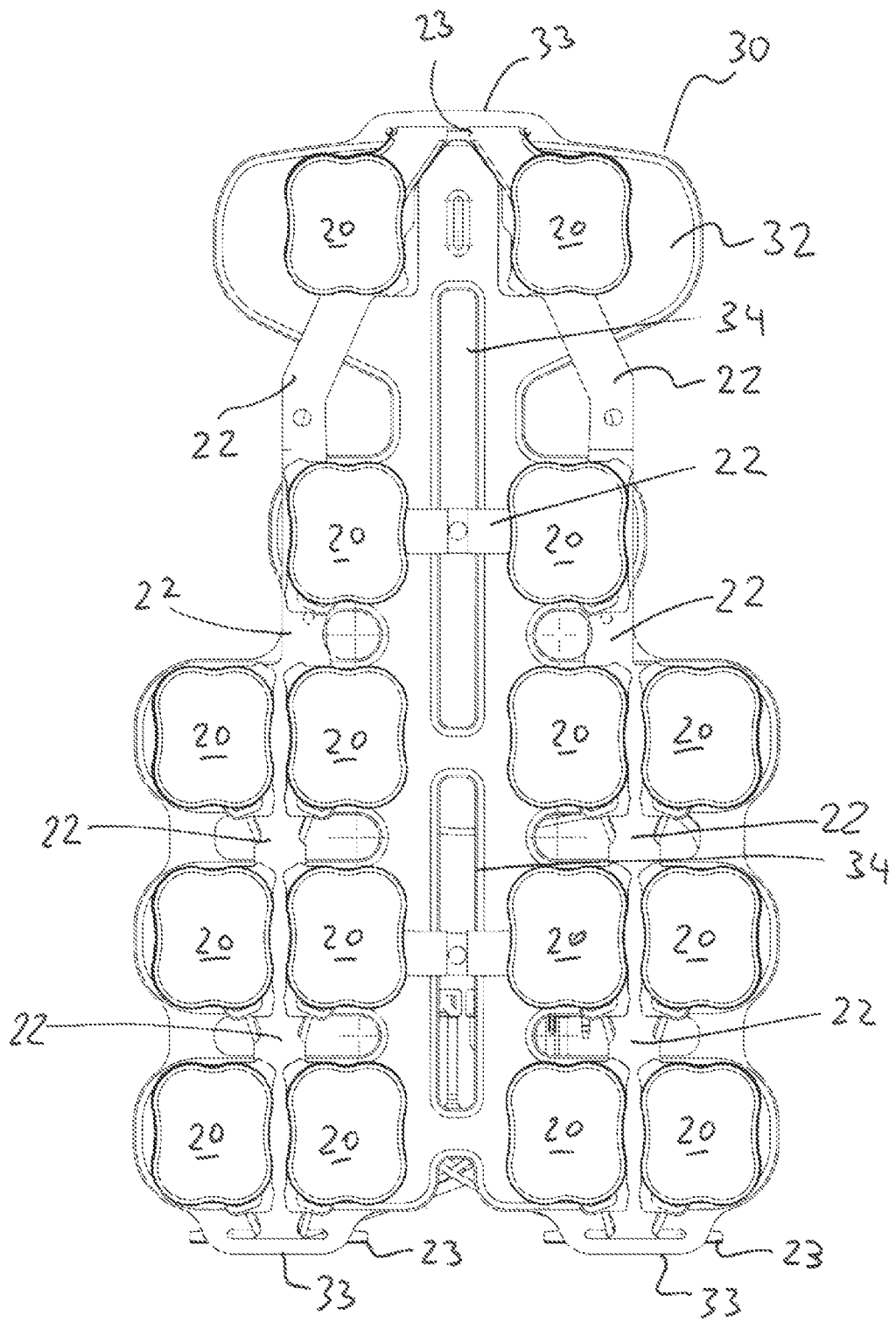
FIG. 4 shows the support device from FIG. 3, provided with multiple hollow bodies.

FIG. 4 shows the combination of support device 30 and hollow bodies 20. The individual hollow bodies 20 are interconnected using connecting means 22, which are non-fluid carrying, in a mat-like manner. This "mat" 20, 22 is provided at the top and bottom with retaining members 23 in the form of toggles or the like. The retaining members 23 engage in the retainers 33 of the support device 30. The combination of the components 20, 22, 23, 30 is for example arranged on the bearing structure of the seat region 1 by arranging the connecting means 22, which cross the central fastening openings 34, on the bearing structure. Other and/or further fastening points are also conceivable. The upholstery 10, 11 with possible recesses 13 can be arranged thereabove.

FIG. 5 shows a support device 30 having a hollow support body 32 which is operated via a fluid inlet and outlet conduit 31. If the seat region 1 is a backrest, the support device and therefore the support effect produced by the support device is adjusted uniformly for the entire back. If the seat region 1 is a seat part, the support device 30 acts equally on both thighs.

The embodiment for the support device 30 shown in FIG. 6 shows two hollow support bodies 32.1, 32.2. Both hollow support bodies 32.1, 32.2 can be filled and/or emptied separately via their own fluid inlet and outlet conduits 31.1, 31.2. If a backrest is assumed as the seat region 1, one hollow support body 32.1 supports the spine region, while the other hollow support body 32.2 supports the region on both sides of the spine. In this case, for example, the spinal column can be supported separately by filling the hollow support body 32.1 particularly extensively, while the hollow support body 32.2 is filled to a lesser extent. If the spinal column is to be relieved or the musculature next to the spinal column massaged, the hollow support body 32.2 is extensively filled, while the hollow support body 32.1 is filled to a lesser extent.

The embodiment example shown in FIG. 7 shows a support device having three hollow support bodies 32.1, 32.2, 32.3. In this case, the hollow support bodies 32.1, 32.2, 32.3 can also be filled and/or emptied via separate fluid inlet and outlet conduits 31.1, 31.2, 31.3. If the seat region 1 is a backrest, the shoulder region and the left and the right lumbar regions can be supported separately.

A motor vehicle seat according to the invention thus offers high seating comfort and allows individual adjustments even when the massage function is switched on.

The invention claimed is:

1. A motor vehicle seat having a seat region (1), in particular a backrest or a seat part covered by a seat cover (12), and multiple fluid filled hollow bodies (20) connected to a first fluid inlet and outlet conduit (21) and arranged in the seat region (1), wherein:
    the hollow bodies (20) are part of a seat displacement device and/or a massage device;
    the hollow bodies (20) are supported by a support device (30) also arranged in the seat region (1) on its side facing away from an occupant sitting in the motor vehicle seat;
    the support device (30) in turn comprises at least one flexible fluid-filled hollow support body (32) which is arranged in the seat region (1) between the support device (30) and the hollow bodies (20) and is spatially separated from the hollow bodies (20);
    the hollow support body (32) is connected to a second fluid inlet and outlet conduit (31) different from the first fluid inlet and outlet conduit (21) and that has no fluid connection to the hollow bodies (20); and
    the hollow bodies (20) are interconnected by non-fluid-conducting connecting means (22) to form a mat structure of the hollow bodies (20) whereby the hollow bodies (20) are not laterally displaceable relative to each other, and whereby the mat structure of the hollow bodies (20) is connected to the support device (30),
    wherein the filling of the hollow support body (32) with a fluid causes the hollow bodies (20) to exert a force through the seat cover (12) on an occupant sitting in the motor vehicle seat,
    wherein the seat region (1) further comprises an upholstery (10, 11), and
    wherein the hollow bodies (20) are arranged in a recess (13) in the upholstery (10, 11).

2. The motor vehicle seat according to claim 1, wherein the hollow bodies (20) are separately fillable with the fluid inlet and outlet conduit (21).

3. A motor vehicle seat having a seat region (1), in particular a backrest or a seat part covered by a seat cover (12), and multiple fluid filled hollow bodies (20) connected to a first fluid inlet and outlet conduit (21) and arranged in the seat region (1), wherein:
    the hollow bodies (20) are part of a seat displacement device and/or a massage device;
    the hollow bodies (20) are supported by a support device (30) also arranged in the seat region (1) on its side facing away from an occupant sitting in the motor vehicle seat;
    the support device (30) in turn comprises at least one flexible fluid-filled hollow support body (32) which is arranged in the seat region (1) between the support device (30) and the hollow bodies (20) and is spatially separated from the hollow bodies (20);
    the hollow support body (32) is connected to a second fluid inlet and outlet conduit (31) different from the first fluid inlet and outlet conduit (21) and that has no fluid connection to the hollow bodies (20); and
    the hollow bodies (20) are interconnected by non-fluid-conducting connecting means (22) to form a mat structure of the hollow bodies (20) whereby the hollow bodies (20) are not laterally displaceable relative to each other, and whereby the mat structure of the hollow bodies (20) is connected to the support device (30),
    wherein the filling of the hollow support body (32) with a fluid causes the hollow bodies (20) to exert a force through the seat cover (12) on an occupant sitting in the motor vehicle seat,
    wherein at least two hollow support bodies (32) are arranged in the seat region (1) and are configured, independently of one another, to support at least a corresponding one of the hollow bodies (20) in subregions of the seat region (1).

* * * * *